United States Patent
Steinke

(10) Patent No.: US 6,782,920 B2
(45) Date of Patent: Aug. 31, 2004

(54) FLUID FLOW CONTROL DEVICE

(75) Inventor: Joseph H. Steinke, Mission Viejo, CA (US)

(73) Assignee: Control Components, Inc., Rancho Santa Margarita, CA (US)

( * ) Notice: Subject to any disclaimer, the term of this patent is extended or adjusted under 35 U.S.C. 154(b) by 12 days.

(21) Appl. No.: 10/275,182

(22) PCT Filed: Mar. 5, 2001

(86) PCT No.: PCT/GB01/01933

§ 371 (c)(1),
(2), (4) Date: Mar. 27, 2003

(87) PCT Pub. No.: WO01/84029

PCT Pub. Date: Nov. 8, 2001

(65) Prior Publication Data

US 2003/0188787 A1 Oct. 9, 2003

(30) Foreign Application Priority Data

May 4, 2000 (GB) .............................. 0010627

(51) Int. Cl.⁷ ............................................. F16K 47/02
(52) U.S. Cl. ................................................ 137/625.3
(58) Field of Search ........................ 137/625.3; 251/118

(56) References Cited

U.S. PATENT DOCUMENTS

| 3,514,074 A | 5/1970 | Self | |
| 3,780,767 A | * 12/1973 | Borg et al. | 137/625.3 |
| 3,917,222 A | 11/1975 | Kay et al. | |
| 4,327,757 A | * 5/1982 | Weevers | 137/625.3 |
| 4,489,753 A | 12/1984 | Frenkel | |
| 5,588,635 A | 12/1996 | Hartman | |
| 6,701,957 B2 | * 3/2004 | McCarty et al. | 137/625.3 |

FOREIGN PATENT DOCUMENTS

| DE | 2728697 | 1/1979 |
| EP | 0727605 | 8/1996 |
| JP | 57192687 | 11/1982 |

* cited by examiner

Primary Examiner—John Fox
(74) Attorney, Agent, or Firm—Stetina Brunda Garred & Brucker

(57) ABSTRACT

A fluid flow control device (10) has a stack of annular discs (15) defining a central passageway (14) and a plug (16) reciprocable in the passageway for controlling fluid flow. Adjacent discs (15) in the stack have at least one fluid passageway (21A) formed in a major face (22A) of one disc closed by the abutting major face of the adjacent disc. The fluid passageway (21A) extends in a clockwise direction and has a linear inlet portion (23A) and a curved outlet portion (24A). The inlet portion (23A) is of constant cross-sectional area and the outlet portion (24A) is of increasing cross-sectional are in the direction of fluid flow. Other configurations of discs and/or fluid passageways are disclosed.

12 Claims, 10 Drawing Sheets

FLUID FLOW CONTROL DEVICE

This invention relates to a fluid flow control device. It may be used to control the flow of liquids or gases and may, for example, be used to provide velocity control of high pressure flowing fluids.

Devices of this general type are sometimes known as variable fluid restrictor control valves, and are exemplified by Self U.S. Pat. Nos. 3,451,404 and 3,514,074 which have frictional passageways, and by Self U.S. Pat. No. 3,513,864 which has multiple abrupt, angular turn passageways.

In the handling of flowing high pressure fluids, it has been customary to utilise orifice means having a high velocity short throat section to attain energy losses or high pressure drops. If the fluid is in a liquid state and liable to flash, that is, vaporise or turn to a gaseous condition on the downstream side of the orifice or valve opening, it may condense implosively and induce damaging shock waves, cause erosion, and the like. Also, as the velocity of the fluid in the valve exceeds the velocity of the fluid in the line, several disturbing reactions occur.

A most serious problem is rapid erosion of the valve surfaces by direct impingement of the liquid and any foreign particle suspended therein. Additional erosion results from cavitation. Cavitation may be defined as the high speed implosion of vapour against those internal parts of the valve controlling flow (the valve trim) and the valve body.

In addition to the severe problems resulting from erosion, the increased velocity also causes the flow characteristics of the valve to become unpredictable and erratic.

Other problems created by the high fluid velocity in the valve are severe noise generation, trim fatigue and possible degradation of flowing fluid materials such, for example, as polymers.

Fluid-borne noise downstream of control valves is often very high. If not treated or contained within the pipe, this noise can result in sound pressure levels of 110 to 170 dB about 0.9 m (three feet) from the valve exit. Sound sources of this magnitude are hazardous to personnel and frequently result in complaints from local residents.

Mufflers and silencers can typically only attenuate fluid-borne noise 20 to 30 dB. Therefore, only partial success has been achieved with them in obtaining desired sound pressure levels. Furthermore, a typical path treatment system i.e., the muffler, lagging support structure etc. is very cumbersome and expensive, often, the total cost of path treatment for noise can exceed the valve cost many times over.

In order to overcome or ameliorate the above problems, there have been introduced devices which effect energy losses in high pressure fluids without increasing velocity and shock wave reaction. This is achieved by subdividing the flow into a plurality of small, long passageways with abrupt turns creating friction and pressure drop in the fluid, thus avoiding damage and erosion in the equipment. Such a device is disclosed, for example, in U.S. Pat. No. Re 32,197.

There, the passageways are provided in an annular stack of separate members having abutting faces enclosing a plurality of individual passageway grooves. The grooves are angular between the inlet and outlet of the stack to turn the fluid and to provide a substantially longer flow length than between the inlet and outlet ends of the stack. The stack is mounted in the fluid passage of a valve housing and a valve plug movable within the annular structure controls the number of passageways in the stack through which the fluid can flow.

A modified device of this type is disclosed in GB-A-2,273,579 in which at least one passageway in the stack of members of discs includes a void between the inlet and outlet region of the disc, the void expanding the cross-sectional area of the energy loss passageway.

In our U.S. Pat. No. 5,687,763 we have described and claimed a structure having improved energy loss passageways, namely a fluid flow control device comprising a plurality of pairs of annular discs forming a rigid structure which incorporates a series of substantially radial passageways for fluid flow. Each disc of said pair has two major faces and passageways which extend completely through said disc between said major faces but extend only partially in a radial direction. The discs of each pair are substantially identical and are aligned with one another with a major face of one disc in direct abutment with a major face of the other disc. The passageways in said one disc interconnect with the passageways in the other disc of the pair so as to provide for fluid flow through the pair of substantially identical discs.

It is an object of the present invention to make a further improved flow control device and parts for use therein. It is also a preferred object of the present invention to provide a fluid control device in which erosion of surfaces, may be reduced.

Accordingly, in one aspect, the present invention provides a stack of annular discs for a flow control device, the discs forming a structure which incorporates a series of passageways for fluid flow, adjacent discs having abutting major surfaces to define said passageways therebetweeen, some at least of the discs each having a passageway extending from its outer perimeter to its inner perimeter, said passageway being formed of a depth to extend only partially into the thickness of the disc, a portion at least of the length of the passageway being curved, the curved portion of the passageway commencing at one of said perimeters and/or a portion at least of the length of the passageway being linear, the linear portion of said passageway commencing at the other of said perimeters.

Preferably, the passageways are grooves or channels formed in at least one of two major faces of a disc and being closed other than at their ends by an abutting major face of an adjacent disc.

In another aspect, the present invention provides an annular disc for incorporation in a fluid flow control device, which device comprises a stack of annular discs, the disc having an inner and an outer perimeter and at least one groove passageway formed in one of its major faces, a portion at least of the length of the passageway being curved, the curved portion of the passageway commencing at one of said perimeters and/or a portion at least of the length of the passageway being linear, the linear portion of the passageway commencing at the other of said perimeters.

The plurality of discs forms a stack in which central apertures of the discs define a central passageway for a reciprocatable plug. The fluid flow passageways formed by the discs lead into or lead from the central passageway depending on the direction of fluid flow through the stack. The plug is positionable in the central passageway to completely close off fluid flow at one extreme and to allow fluid flow through all the disc passageways at the other extreme. The position of the plug between these extremes may be adjusted to allow the desired flow rate between fully off and fully on, i.e. to allow flow through the passageways of a lesser or greater number of discs, as required.

In another aspect, the present invention provides a fluid flow control device incorporating a stack of annular discs, central apertures of the annular discs forming a central passageway extending longitudinally of the stack, a plug reciprocably movable within the central passageway and an actuator to move the plug as required to control fluid flow through the device from a fully closed through partially open positions to a fully open position, adjacent discs having abutting major faces defining at least one fluid passageway extending between inner and outer perimeters of the discs, said passageway being curved for at least a portion of its length commencing at one of said perimeters and/or being linear for at least a portion of its length commencing at the other of said perimeters.

In one embodiment, flow through the fluid passageways across the discs is from the outer perimeters to the inner perimeters of the discs, i.e. into the central passageway. The central passageway is then connected to an outlet for the fluid.

In another embodiment, flow through the fluid passageways across the discs is from the inner perimeters to the outer perimeters of the discs, i.e out of the central passageway. The central passageway is then connected to an inlet for the fluid.

In both embodiment, it is preferred that the fluid passageways have an initial linear portion commencing at an inlet end and then a curved portion across the disc terminating at an outlet end. Preferably, the linear portion is at an angle of less than 90° to the tangent at the point of entry, i.e. at the junction of the passageway with the disc perimeter. For example, it may be at an angle of from 5° to 30° to that tangent.

When the fluid flows into the central passageway, it will enter that passageway at an angle to the radius at that point, erosion of the central passageway walls and of the valve plug thereby being reduced.

The passageways need not be of constant cross-section along their length and, indeed, it may be preferable that they increase or decrease in cross-sectional area between the inlet and outlet ends thereof. In order to maximise the energy loss imparted to a fluid travelling through the passageways or to allow for an increase in fluid volume that can occur with compressible media, it is particularly preferred that the passageways increase in cross-sectional area in the direction towards their outlet ends. Although such a cross-sectional area change may be achieved by varying the depth of the passageway at constant width, it is preferred to vary the passageway width at constant depth. Alternatively, the cross-sectional area may be changed by varying both the width and depth of the passageway.

A flow passageway with a continuously expanding area from the inlet end will see a significant flow capacity increase with erosion of the inlet. Accordingly, it may be advantageous to design the passageways with the initial linear portion of uniform cross-sectional area to keep the capacity of the passageway constant in that initial portion whereby the initial portion is more resistant to erosion.

A single disc may carry one or more passageways between its outer and inner perimeters. Thus, there may be, for example, one, two or three independent passageways across one major face of a disc.

A disc may have the fluid passageway(s) formed in one major face only with the other major face being planar for closing the passageway(s) of an adjacent disc. Alternatively, a disc may have fluid passageways formed in both major faces that are closed by abutting planar major faces of adjacent discs on each side.

When a disc and its passageway(s) are viewed in plan, the passageway(s) may extend in either a clockwise or a counter clockwise direction across the disc. Where a disc has more than one passageway, the passageways preferably extend in the same direction. For some applications, however, a combination of clockwise and counterclockwise passages may be found to be advantageous.

As indicated above, the preferred direction of fluid flow will be in the direction of increase of passageway cross-section. Reference to "clockwise" and "counter-clockwise" passageways will herein, therefore, refer to the intended direction of fluid flow through those passageways.

In a preferred embodiment, the discs may be arranged so that clockwise passageways alternate in the stack of discs with counter clockwise passageways. This arrangement can permit flow disruptions that reduce or eliminate vortex production in the device outlet.

Alternatively, if desired, a vortex can be designed into the outlet by appropriate arrangement of the passageways. For example, the discs may be arranged with all the passageways extending in the same direction.

The discs may be flat but this is not essential and it may be found advantageous to utilise a stack of conical or dished discs. The dish effect of the disc imparts an axial vector to the process fluid as it discharges from or enters the disc and can further reduce the angle of impact at the plug throttling edge.

By way of example only, for an annular disc of about 4.75 inches overall diameter and about 1.12 inches radial extent from its inner to its outer perimeter, the linear portion of the passageway may extend for 0.5 to 2.0 inches and the curved portion of passageway for 1 to 4 inches on a variable radius of curvature of from 0.5 to 2.0 inches.

The discs may be made of any suitable material, depending on the valve requirements in which the fluid control device is to be used and, particularly, on the nature of the fluid and its temperature, pressure and velocity. The discs are preferably made of tungsten carbide or ceramic material.

The passageways may be formed across the discs by any convenient means and the skilled man of the art will readily be able to choose a suitable means depending on the chosen disc material. It is preferred to machine the passageways in discs made from tungsten carbide or from ceramic material in the green state before the disc has been fully hardened.

According to yet another aspect, the present invention provides a flow control device including a plurality of annular discs arranged in a stack, each disc having an outer perimeter and an inner perimeter, adjacent discs in the stack having opposed, abutting major surfaces providing at least one fluid passageway extending from the outer perimeter to the inner perimeter, the passageway having a linear portion commencing at one of the inner and outer perimeters and/or a curved portion commencing at the other of the inner and outer perimeters.

Preferably, the passageway is formed in a major surface of one disc and has a depth to extend only partially into the thickness of the disc, and the passageway is closed other than at its ends by the abutting major surface of the adjacent disc.

Advantageously, the linear portion is provided at an inlet end of the passageway and the curved portion is provided at an outlet end of the passageway. Preferably, the linear portion is of constant cross-section and the curved portion is of increasing cross-section in the direction of fluid flow. Advantageously, the linear portion extends at angle of less than 90° to the tangent at the perimeter of the disc.

According to a still further aspect, the present invention provides an annular disc for a fluid control device comprising a stack of discs, the disc having an outer perimeter and an inner perimeter, the inner perimeter defining a central aperture, and the disc having at least one groove providing a fluid passageway in a major face on one side of the disc, the groove extending between the outer perimeter and the inner perimeter and having a linear portion at one end and/or a curved portion at the other end.

The linear portion may be provided at the inlet end of the fluid passageway, is preferably of constant cross-section and/or optionally extends at angle of less than 90° to the tangent at the perimeter of the disc.

According to yet another aspect, the present invention provides a flow control device including a plurality of annular discs arranged in a stack, each disc having an outer perimeter and an inner perimeter, adjacent discs in the stack having opposed, abutting major surfaces providing at least one fluid passageway extending from the outer perimeter to the inner perimeter, wherein the discs are of conical shape.

By the use of discs having a conical shape, an axial vector is imparted to fluid flow through the passageway which may have advantages for certain applications.

Preferably, the passageway is formed in a major surface of one disc and has a depth to extend only partially into the thickness of the disc, and the passageway is closed other than at its ends by the abutting major surface of the adjacent disc.

Advantageously, a linear portion is provided at an inlet end of the passageway and a curved portion is provided at an outlet end of the passageway. Preferably, the linear portion is of constant cross-section and the curved portion is of increasing cross-section in the direction of fluid flow. Advantageously, the linear portion extends at angle of less than 90° to the tangent at the perimeter of the disc.

According to a still further aspect, the present invention provides an annular disc for a fluid control device comprising a stack of discs, the disc being of conical shape having an outer perimeter and an inner perimeter, the inner perimeter defining a central aperture, and the disc having at least one groove providing a fluid passageway in a major face on one side of the disc, the groove extending between the outer perimeter and the inner perimeter and having a depth less than the thickness of the disc.

Preferably, the groove has a linear portion provided at the inlet end of the fluid passageway, and the linear portion may be of constant cross-section and/or optionally extends at angle of less than 90° to the tangent at the perimeter of the disc.

According to a still further aspect, the present invention provides a flow control device including a plurality of annular discs arranged in a stack, each disc having an outer perimeter and an inner perimeter, adjacent discs in the stack having opposed, abutting major surfaces providing at least one fluid passageway extending from the outer perimeter to the inner perimeter, wherein the stack has discs with clockwise passageways alternating with counter clockwise passageways.

By the use of alternating clockwise and counter clockwise passageways, flow emerging from the passageways may be disrupted reducing or eliminating vortex production.

Preferably, the passageway between adjacent discs is formed in a major surface of one disc and has a depth to extend only partially into the thickness of the disc, and the passageway is closed other than at its ends by the abutting major surface of the adjacent disc.

Advantageously, a linear portion is provided at an inlet end of the passageway and a curved portion is provided at an outlet end of the passageway. Preferably, the linear portion is of constant cross-section and the curved portion is of increasing cross-section in the direction of fluid flow. Advantageously, the linear portion extends at angle of less than 90° to the tangent at the perimeter of the disc.

Preferably, the passageway(s) of alternate discs are axially aligned at the inner perimeter and angularly offset at the inner perimeter relative to the passageway(s) of adjacent discs.

According to a still further aspect, the present invention provides an annular disc for a fluid control device comprising a stack of discs, the disc having an outer perimeter and an inner perimeter, the inner perimeter defining a central aperture, and the disc having at least one groove providing a fluid passageway in a major face on one side of the disc, the groove extending between the outer perimeter and the inner perimeter and having a linear portion of constant cross-section at an inlet end and a curved portion of increasing cross-section in the direction of fluid flow at an outlet end.

Preferably, the linear portion extends at angle of less than 90°, for example in the range 5° to 30° to the tangent at the perimeter of the disc, and the passageway extends in a clockwise or counter clockwise direction when the disc is viewed in plan.

Embodiments of the invention will now be described by way of example only with reference to the accompanying drawings in which:

FIG. 1 shows a balance valve assembly particularly suitable for use for the discharge of erosive slurries, which may be, for example, three phase slurries containing gas, liquid and solids.

Figure 1:
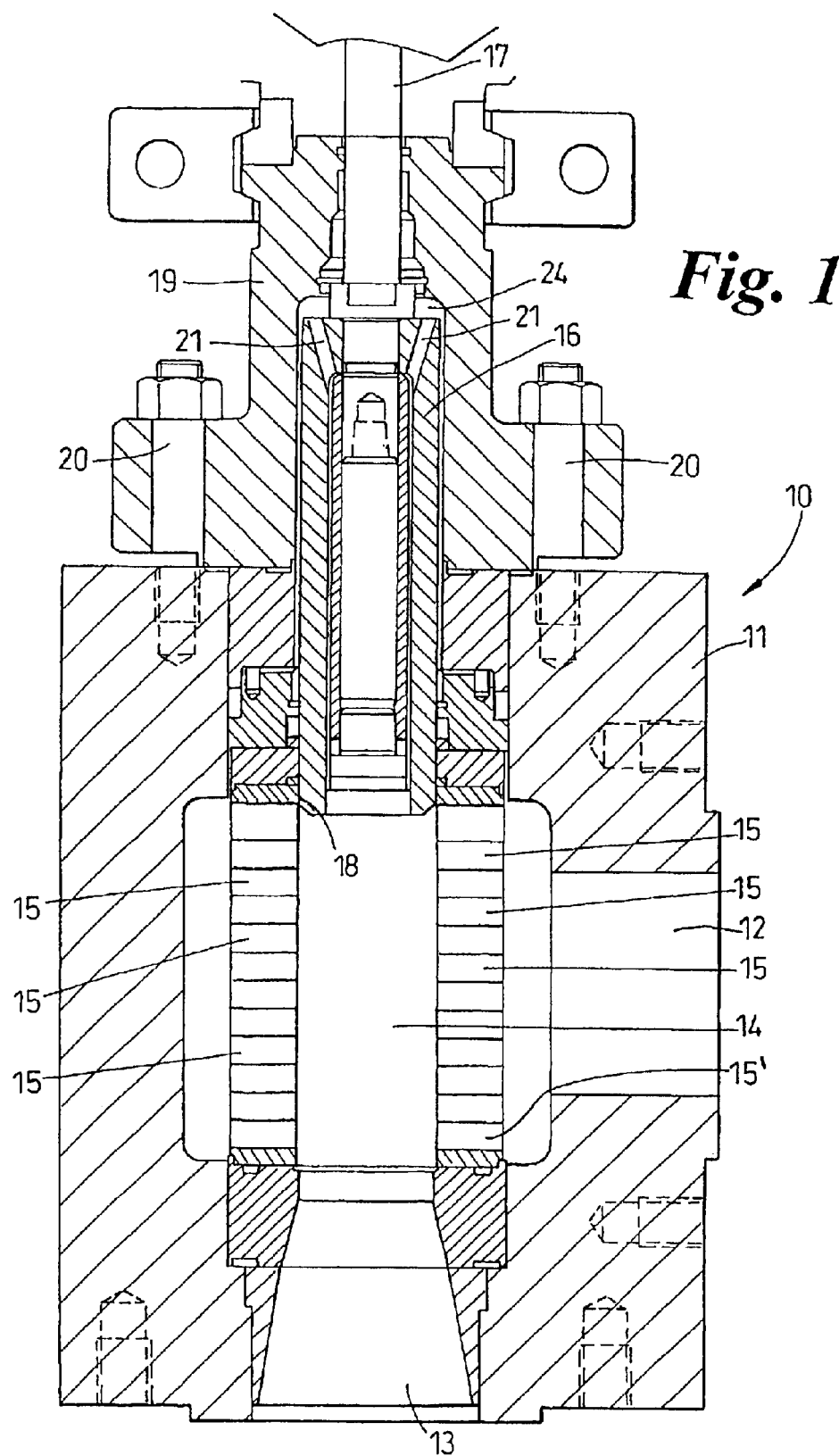
FIG. 1 is a longitudinal cross-section of a valve utilising a flow control device of the present invention.

The assembly 10 has a valve body 11 with an inlet 12 and an outlet 13, the latter being tapered to provide a gradually increasing volume to slow down the slurry flow rate and thereby reduces its erosive effect as it leaves the valve. Between inlet 12 and outlet 13 lies a central chamber or passageway 14 which is defined by the central aperture of each of a rigid stack of annular discs 15.

The discs 15 provide passageways between the inlet and outlet and a reciprocable valve plug 16 is movable by conventional actuation means (not shown) acting on connecting rod 17 between the fully open position as shown to the fully closed position. In the latter position the plug has been lowered until its lower end 18 is below the lowermost annular disc 15', thereby closing off flow through the valve.

It will be appreciated that the plug 16 may be moved to any desired intermediate position between fully open and fully closed to open an appropriate degree of flow through those discs below end 18 of the plug.

In the fully open position as shown, plug 16 moves up into and reduces a space 24 provided in a top casing 19 clamped to the upper surface of valve body 10 by bolts 20.

To minimise the force that the actuator has to exert to move plug 16 between different positions, fluid pressure is balanced across the plug by a pair of passageways 21 for fluid communication between the chamber 14 and the space 24. The actuator is responsive to system control signals in a well-known manner.

The discs 15 in FIG. 1 may be of one or more of the types of discs described below with reference to FIGS. 2 to 17.

In the following description references to "clockwise" and "counter clockwise" are in respect of the intended direction of flow of fluid through a disc although it will be appreciated that in practice it may in certain circumstances be desirable to allow the fluid to flow in the opposite direction.

The discs of FIGS. 2 to 9 and 16 and 17 are flat discs whereas those of FIGS. 10 to 15 have a dished upper surface into which the groove(s) or passageway(s) have been formed and a correspondingly conical lower surface. Like parts in the discs below are labelled with like unit digits.

Figure 2:
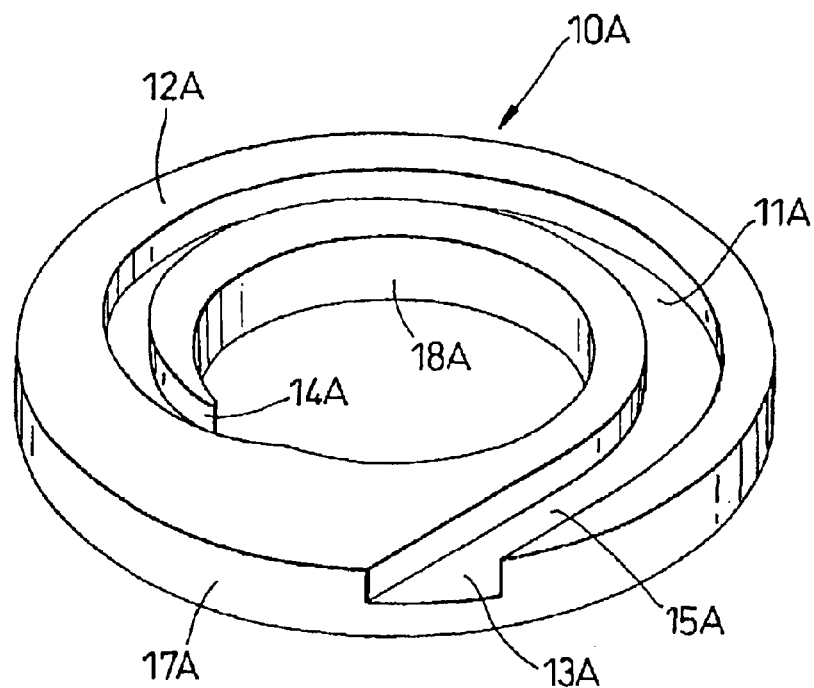
FIGS. 2 to 17 are elevations of sixteen different discs for use in the invention.
Figure 3:
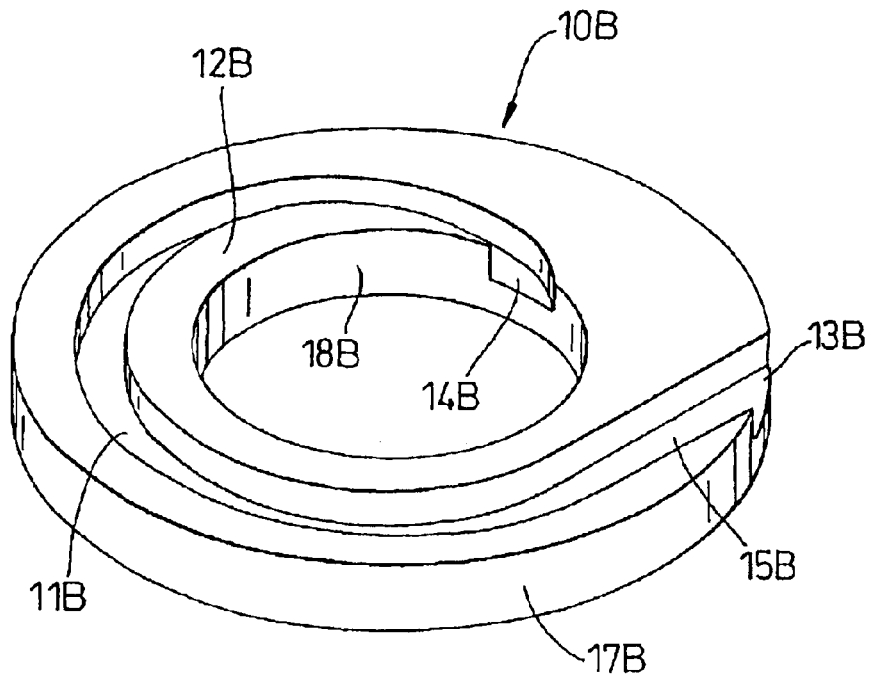

FIGS. 2 and 3 show a pair of annular discs 10A and 10B each having a single passageway 11A, 11B respectively in its upper surface 12A, 12B respectively, the passageway extending from the interior perimeter 18A, 18B to the exterior perimeter 17A, 17B.

Inlet 14A of passageway 11A of disc 10A is narrower than outlet 13A of that passageway and the passageway generally extends in a clockwise direction. Thus as the depth of the passageway is constant throughout its length, as it is for all the discs described below, the cross-sectional area of the passageway increases from its inlet 14A towards its outlet 13A except for a linear portion 15A extending inwardly from the outlet 13A. As can be seen, the passageway is curved other than for portion 15A.

Similarly outlet 13B of passageway 11B of disc 10B is wider than inlet 14B and in this instance the passageway extends in a generally counter-clockwise direction. Again, passageway 11B has linear portion 15B extending inwardly from its outlet 13B, the remainder of the passageway being curved.

It will be appreciated that if it is desired in these embodiments to cause the fluid to flow from a wider inlet to a narrower outlet, i.e. in the opposite direction to that described, then the linear portions of the passageways will commence at the start of the passageways, i.e. at the inlets.

It will also be appreciated that in the various specific embodiments shown and described herein, other portions of the passageways may be linear or curved depending on the number of passageways, flow area, inside and outside diameters of the discs and other variables.

Figure 4:
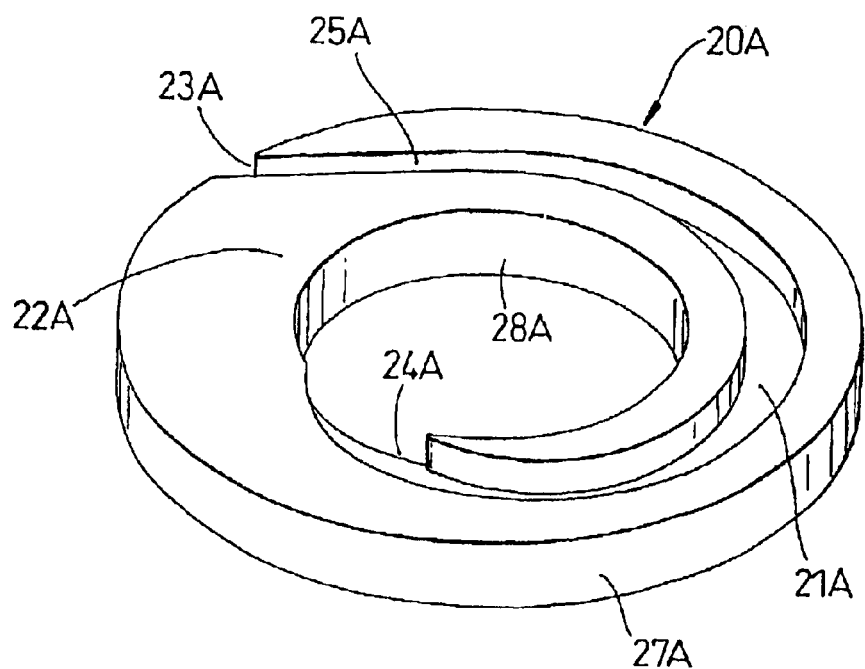
Figure 5:
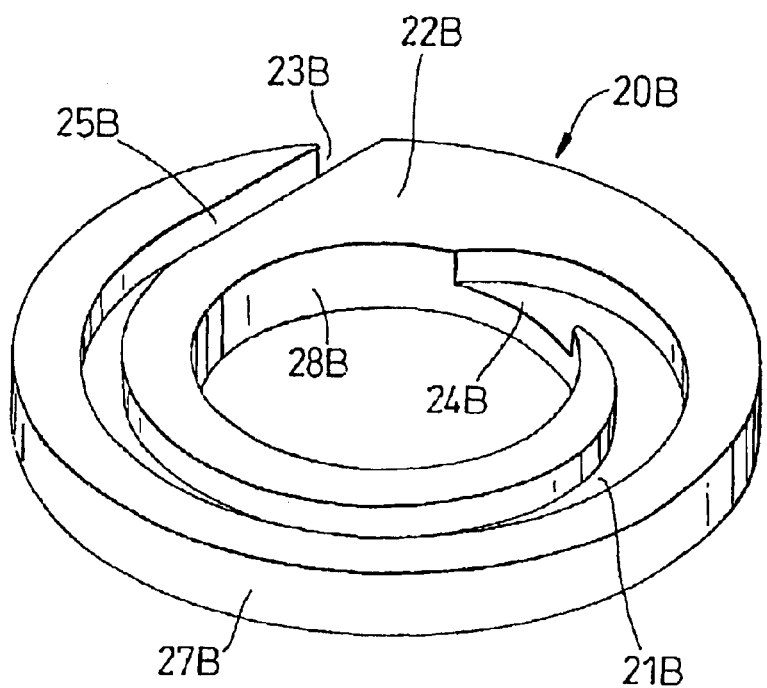

FIGS. 4 and 5 show particularly preferred embodiments of the invention, being another pair of annular discs 20A and 20B, each having a single passageway 21A, 21B respectively in its upper surface 22A, 22B respectively. In these discs, outlets 24A, 24B are wider than inlets 23A, 23B, disc 20A having a clockwise passageway and disc 20B a counter clockwise passageway. Each passageway commences from its inlet with a linear constant area portion 25A, 25B and then continues to its outlet as an expanding area curved passageway.

Figure 6:
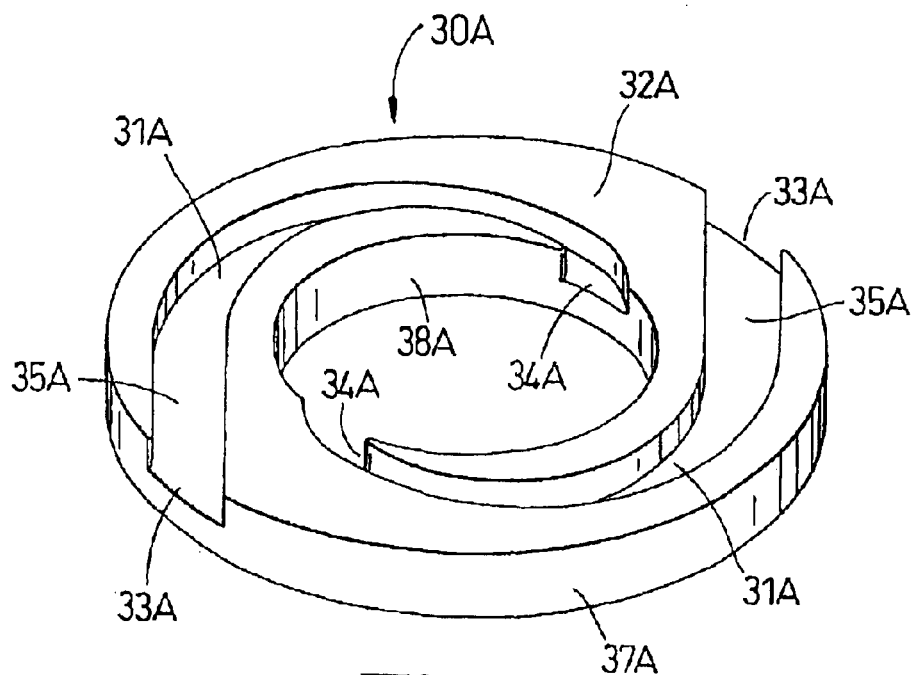
Figure 7:
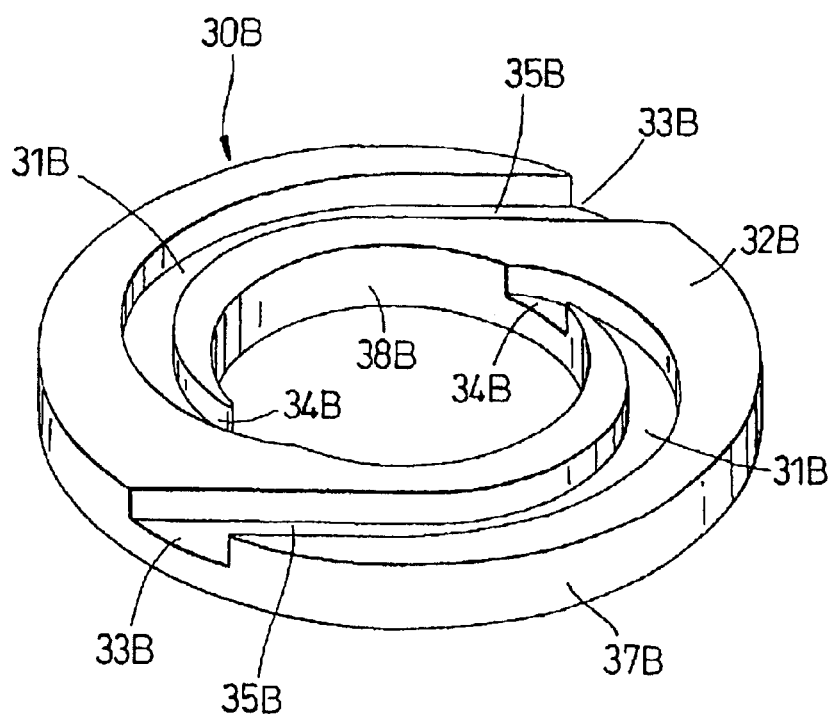

FIGS. 6 and 7 show a pair of discs 30A and 30B, each having two passageways 31A or 31B in its upper surface 32A or 32B.

Inlet 34A of each passageway 31A is narrower than its respective outlet 33A and both passageways extend in a generally counter-clockwise direction. Each passageway 31A has a final linear portion 35A extending from its outlet 33A, the remainder of the passageway being a continuous curve.

Similarly outlet 33B of each passageway 31B is wider than its respective inlet 34B but in this instance the passageways extend in a clockwise direction. Again each passageway 31B has a linear portion 35B extending from its outlet 33B, the passageway then continuing to its inlet as a continuous curve.

Figure 8:
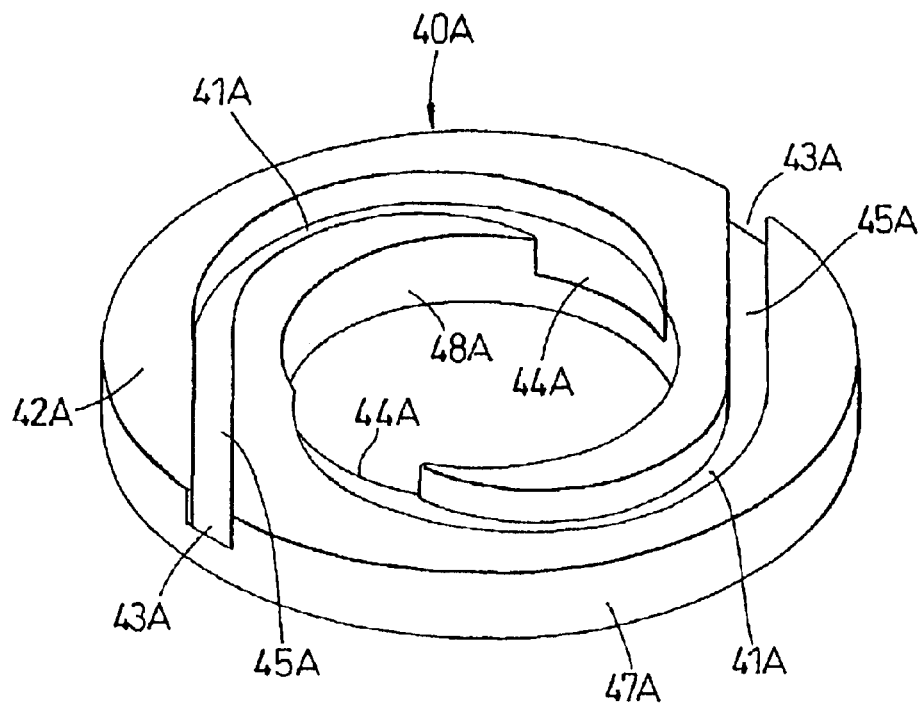
Figure 9:
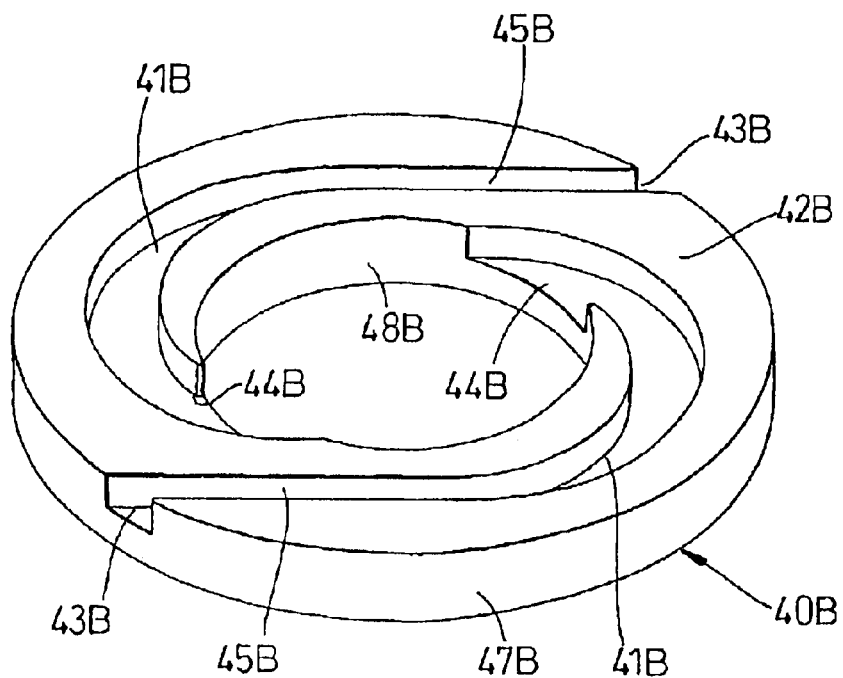

FIGS. 8 and 9 show another pair of annular discs 40A and 40B, each having two passageways 41A or 41B respectively in its upper surface 42A, 42B. In these discs the outlets 44A, 44B are wider than the inlets 43A, 43B of the passageways, disc 40A having clockwise passageways and disc 40B having counter clockwise passageways. Each passageway has an initial linear portion 45A, 45B which then continues as a continuous curve to its outlet.

Figure 10:
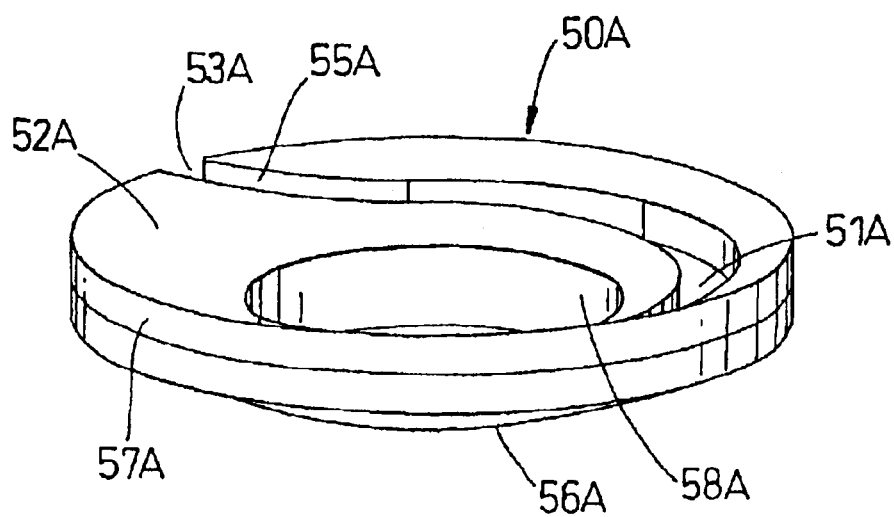
Figure 11:
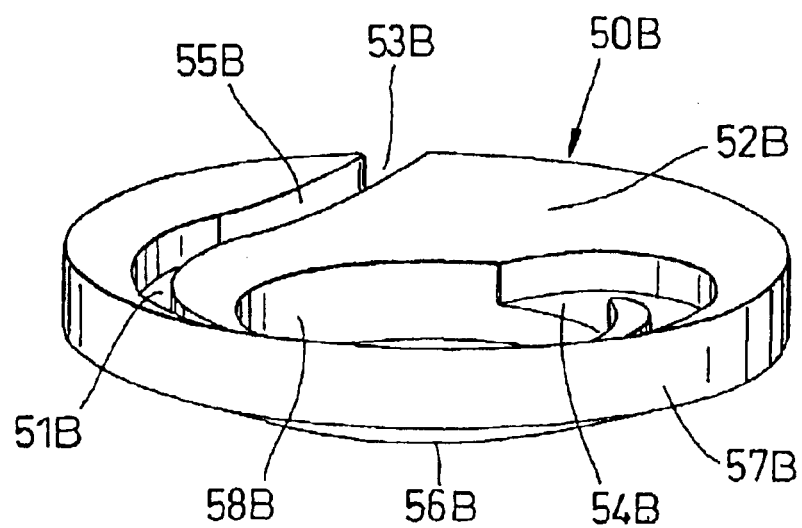

FIGS. 10 and 11 show a pair of conical or dished annular discs 50A and 50B, each having a lower conical or dished surface 56A, 56B respectively and a correspondingly dished upper surface 52A, 52B respectively. Each disc has a single passageway 51A, 51B in its upper surface, the passageway, as with the flat discs, extending from the outer perimeter 57A, 57B to the inner perimeter 58A, 58B of the disc. Both discs have narrower inlets 53A, 53B than outlets (54B)— outlet 54A not being visible in FIG. 10. The passageway 51A of disc 50A runs clockwise on the disc whereas passageway 51B of disc 50B runs counter clockwise. Again, the passageways 51A, 51B have an initial linear portion 55A, 55B respectively at their inlet end and then continue as curved passageways to their respective outlet.

Figure 12:
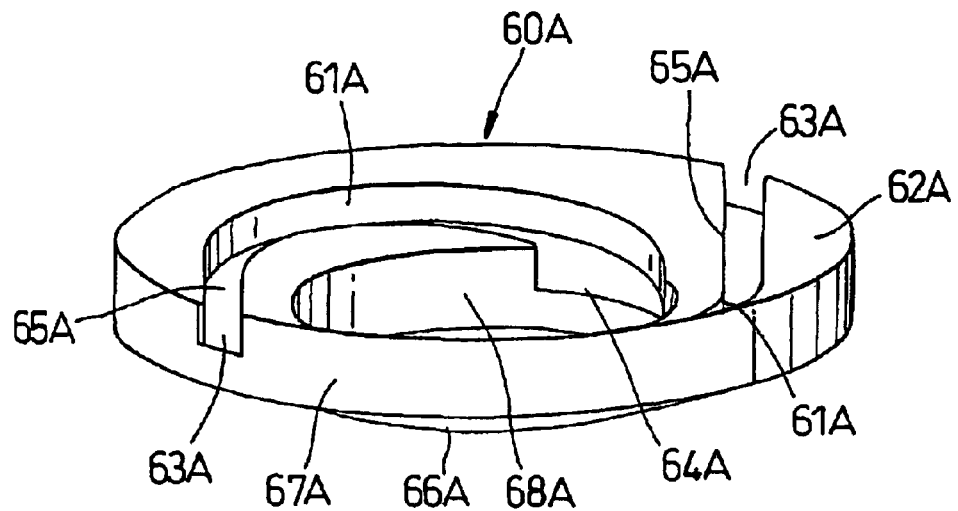
Figure 13:
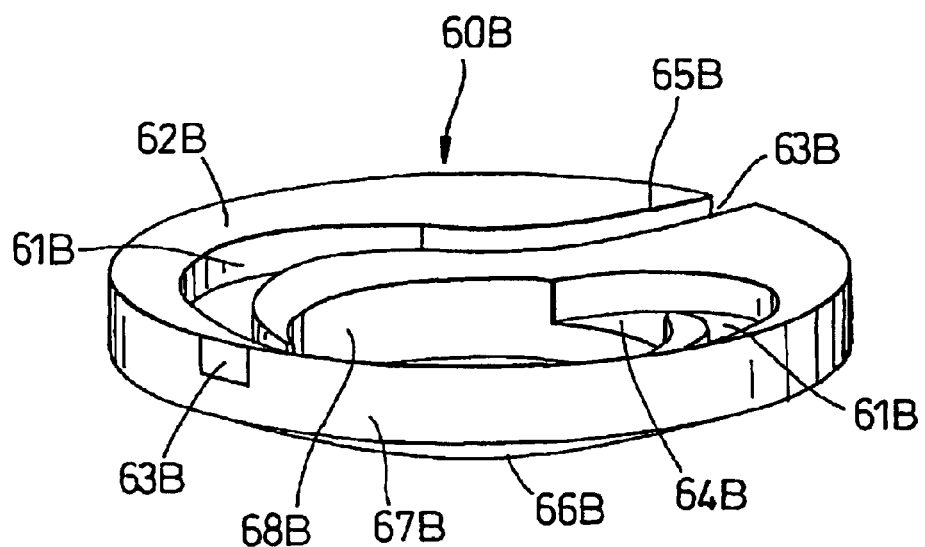

FIGS. 12 and 13 show another pair of conical discs 60A, 60B each having two passageways 61A or 61B respectively in its upper dished surface 62A, 62B. Each passageway has a narrower inlet 63A, 63B than outlet 64A, 64B (only one outlet being visible in each Figure), and each, again, has an initial linear portion 65A, 65B commencing from its inlet. Passageways 61A extend generally clockwise and passages 61B counter clockwise.

Figure 14:
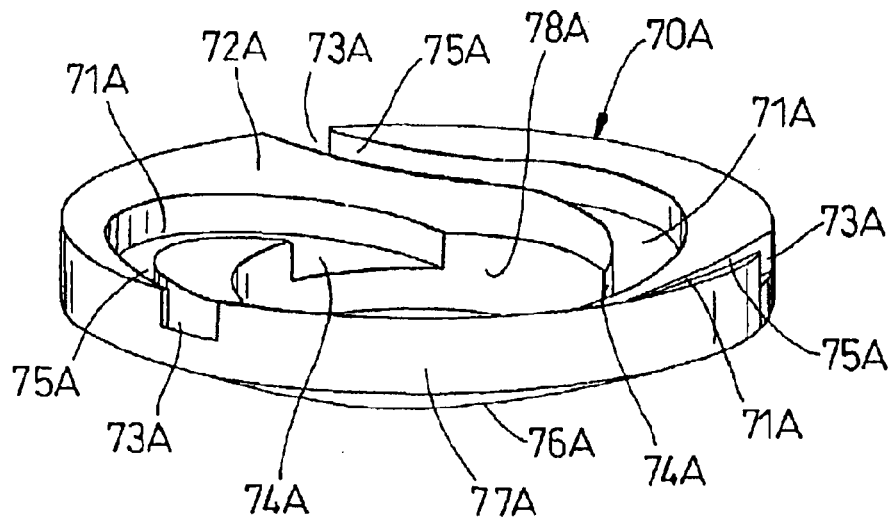
Figure 15:
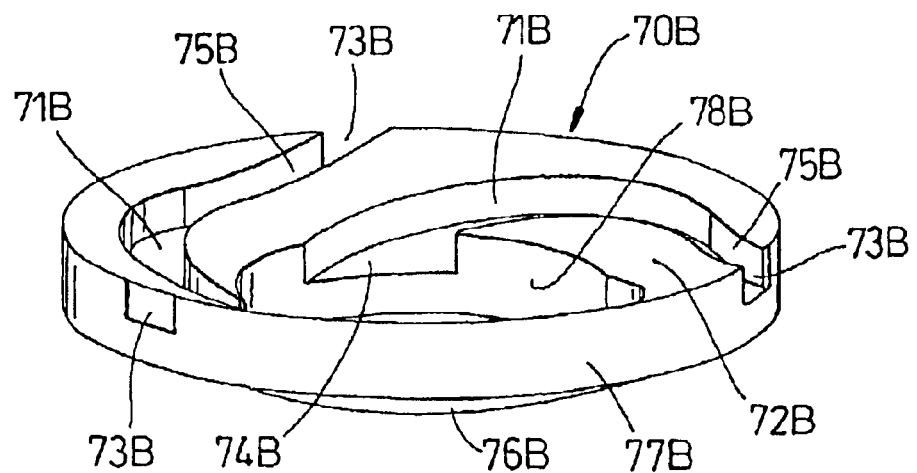

FIGS. 14 and 15 show another pair of conical discs 70A, 70B, each having three passageways 71A or 71B in its upper face 72A, 72B. The passageways are narrower at their inlets 73A, 73B than their outlets 74A, 74B (not all the outlets being visible). As before, each passageway has an initial linear portion 75A, 75B and the passageways in disc 70A run clockwise whereas those in disc 70B run counter clockwise.

Figure 16:
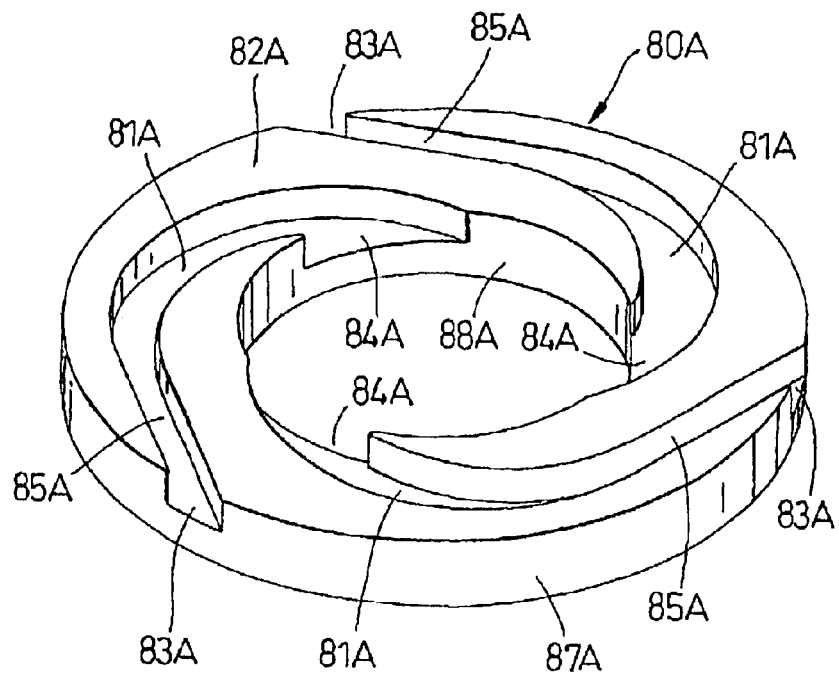
Figure 17:
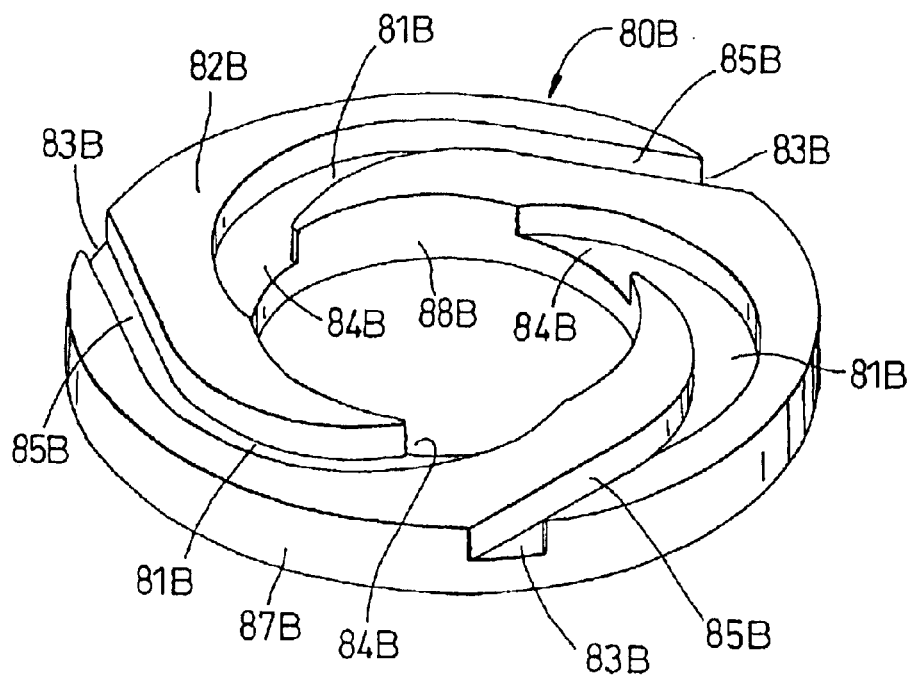

FIGS. 16 and 17 show another pair of annular discs 80A, 80B, each of which is a flat disc. Each disc has three passageways 81A or 81B in its upper surface 82A, 82B. The passageways of disc 80A extend in a clockwise direction from their inlets 83A to their outlets 84A and the passageways of disc 80B extend in a counter clockwise direction from their inlets 83B to their outlets 84B. The inlets 83A, 83B are narrower than the outlets 84A, 84B. As before, each passageway has an initial linear portion 85A, 85B extending from its inlet and then continues as a curved passageway to its outlet.

Figure 18:
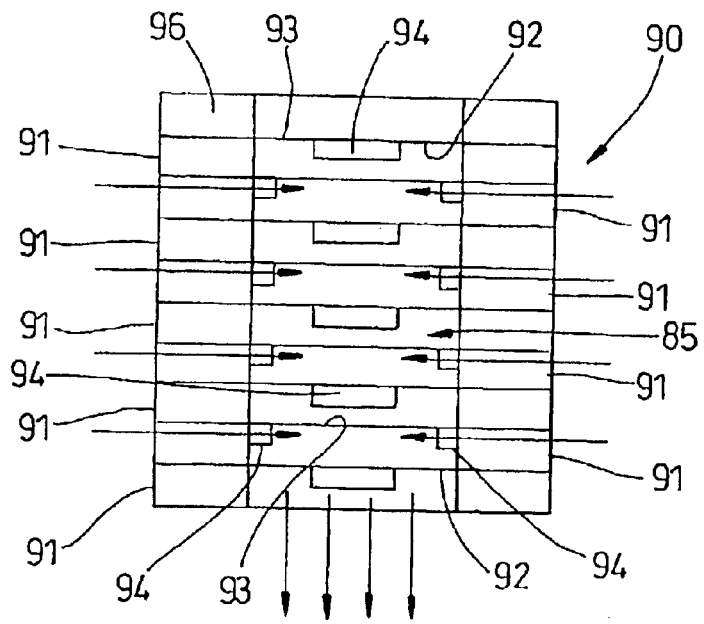
FIG. 18 is a longitudinal sectional view of a stack of flat discs of the invention.

In FIG. 18 is shown a section through stack 90 of flat annular discs 91, each disc of which may for example be of any one of the types illustrated in and described with reference to FIGS. 6 to 9 having two fluid passageway grooves in its upper major surface 92, the grooves being closed from above by the lower major face 93 of the disc above.

The grooves open into the central aperture at 180° to each other and adjacent discs 91 are rotated through 90° to each other so that the outlets 94 of adjacent discs 91 are offset relative to each other and the outlets 94 of alternate discs 91 are aligned in the axial direction. Only the outlets 94 of the passageways are visible in this section, each outlet 94 leading into the central passageway 95 defined by the stacked discs.

An upper plain annular disc 96 closes the upper end of the central passageway and flow is illustrated by the arrows, travelling from the outer perimeter of each disc 91 into central passageway 95 and then downwardly out of that passageway 95.

It will be understood that each disc 91 of the stack 90 may be of any of the types shown in FIGS. 2 to 5 and FIGS.

16, 17 with the adjacent discs appropriately rotated so that fluid passageways of adjacent discs are angularly offset at the inner perimeter and fluid passageways of alternate discs are aligned at the inner perimeter in the axial direction. Other arrangements of the discs may be employed to provide the required flow characteristics.

Figure 19:
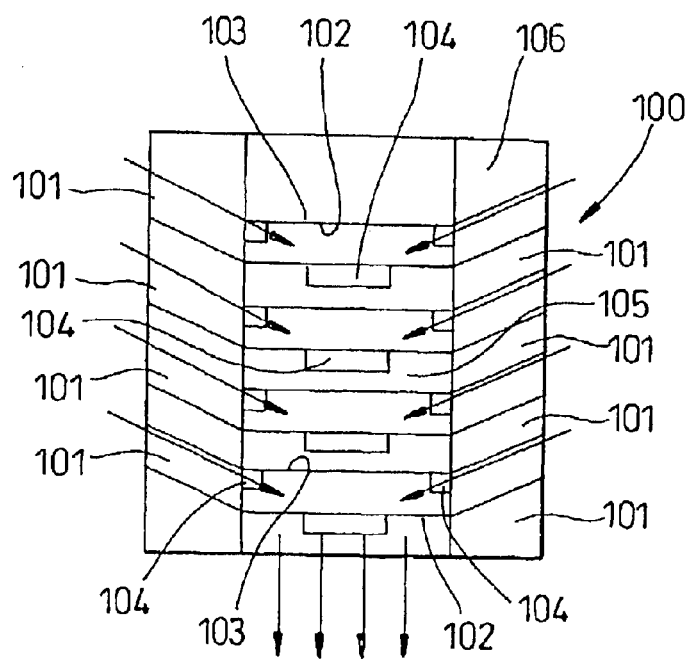
FIG. 19 is a similar view to FIG. 18 of a stack of dished or conical discs of the invention.

FIG. 19 illustrates in similar section flow through a stack 100 of dished annular discs 101, each of which may for example be any one of the types illustrated in and described with reference to FIGS. 12 and 13 having two fluid passageway grooves in its upper major surface 102 closed from above by the lower major face 103 of the disc above.

The grooves open into the central aperture at 180° to each other and adjacent discs 101 are rotated through 90° to each other so that the outlets 104 of adjacent discs are offset relative to each other and the outlets 104 of alternate discs 101 are aligned in the axial direction. Again only the outlets 104 of each passageway are visible in this section, each outlet 104 leading into the central passageway 105 defined by the stacked discs.

An upper ungrooved dished annular disc 96 closes the upper end of the central passageway and flow is again illustrated by the arrows, travelling from the outer perimeter of each disc 101 into central passageway 105 and then downwardly out of passageway 105.

It will be understood that each disc 101 of the stack 100 may be of any of the types shown in FIGS. 10,11 and FIGS. 14,15 with the adjacent discs appropriately rotated so that fluid passageways of adjacent discs are angularly offset at the inner perimeter and fluid passageways of alternate discs are aligned at the inner perimeter in the axial direction. Other arrangements of the discs may be employed to provide the required flow characteristics.

It will be appreciated that FIGS. 18 and 19 are for general flow illustration purposes only and that in practice a plug and outlet arrangement, e.g. as shown in FIG. 1, will be required for operation of the device.

It will also be appreciated that flow control devices of the invention can be arranged to have a wide variety of disc configurations to suit a wide variety of flow requirements, each of which can be configured to reduce wear and tear on the device components.

It will also be appreciated that the exemplary embodiments described herein are intended to illustrate the diverse range and application of the invention and that features of the embodiments may be employed separately or in combination with any other features of the same or different embodiments to produce any desired flow control device.

Moreover, while the specific shapes and/or configurations of discs described and illustrated are believed to represent the best means currently known to the applicant, it will be understood that the invention is not limited thereto and that various modifications and improvements can be made within the spirit and scope of the claims.

What is claimed is:

1. In a fluid flow control device incorporating a stack of annular discs, each disc having an inner perimeter and an outer perimeter, the inner perimeter of each disc defining a central aperture such that the annular discs form a central passageway extending longitudinally through the stack, adjacent discs having abutting major faces defining at least one fluid passageway extending between the inner and outer perimeters of the discs, and a control member reciprocally movable within the central passageway to control fluid flow through the device, the improvement comprising:

the at least one fluid passageway comprising a groove in at least one of the abutting major faces of adjacent discs, the groove having an inlet commencing at one of the inner and outer perimeters and an outlet at the other of the inner and outer perimeters, the inlet opening to a linear portion of the groove, the linear portion leading to a curved portion of the groove, and the curved portion terminating at the outlet.

2. The flow control device of claim 1 wherein the linear portion of the fluid passageway is of uniform cross-sectional area and the curved portion of the fluid passageway is of increasing cross-sectional area in a direction of flow.

3. The flow control device of claim 1 wherein the linear portion extends at an angle of less than about ninety degrees relative to a tangent at a point of entry defined by the inlet.

4. The flow control device of claim 1 wherein each of the discs has a conical shape.

5. The flow control device of claim 1 wherein each of the discs is generally flat.

6. The flow control device of claim 1 wherein flow through the fluid passageway is from the outer perimeters to the inner perimeters of the discs.

7. The flow control device of claim 1 wherein flow through the fluid passageway is from the inner perimeters to the outer perimeters of the discs.

8. The flow control device of claim 1 wherein a plurality of individual fluid passageways is provided between the outer and inner perimeters of at least one pair of adjacent discs.

9. The flow control device of claim 8 wherein the fluid passageways extend in at least one of a clockwise direction and a counter-clockwise direction.

10. The flow control device of claim 9 wherein the discs are arranged so that fluid passageways in the clockwise direction alternate in the stack of discs with fluid passageways in the counter-clockwise direction.

11. The flow control device of claim 1 wherein the discs are each fabricated from a material selected from the group consisting of:

tungsten carbide; and ceramic material.

12. The flow control device of claim 1 wherein the control member comprises a plug reciprocally movable within the central passageway from a fully closed position through a range of partially open positions to a fully open position, from a fully open position through a range of partially open positions to a fully closed position, under the control of an actuator.

* * * * *